June 4, 1940.  J. E. MILLS  2,203,418
SWATHER BAR
Original Filed Oct. 6, 1938
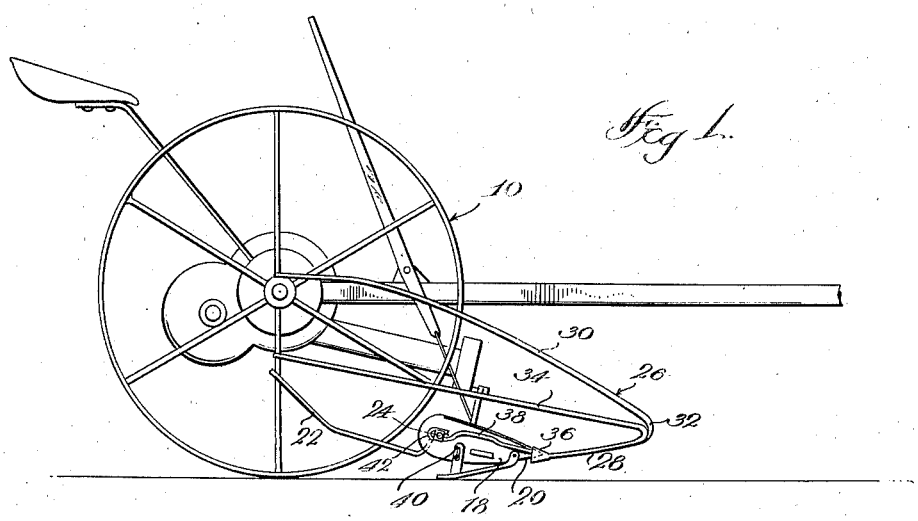
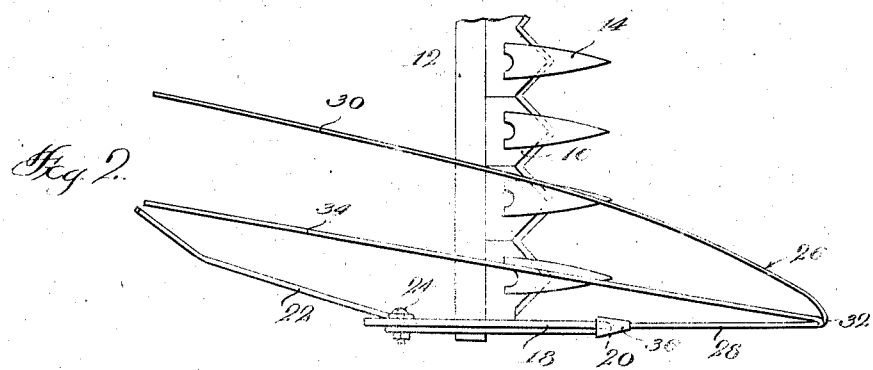
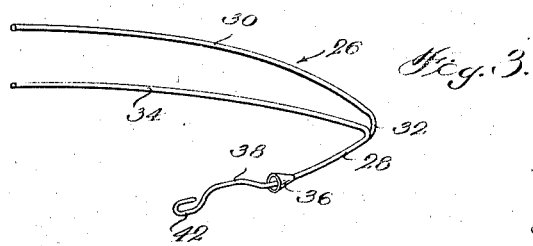
John E. Mills
INVENTOR
BY Victor J. Evans & Co.
ATTORNEYS Patented June 4, 1940

2,203,418

UNITED STATES PATENT OFFICE 2,203,418

SWATHER BAR

John E. Mills, McCook, Nebr.

Application October 6, 1938, Serial No. 233,675
Renewed April 22, 1940

3 Claims. (Cl. 56—320)

My invention relates to mowing machines, and has among its objects and advantages the provision of an improved swather bar.

Mowing machines, commonly termed "mowers," are provided with divider boards attached to the guard shoes secured to the grain ends of the sickle bars. The purpose of the dividing board is to move the cut grass or other growth away from the standing grass or growth so as to prevent damage to the cut growth upon return of the mower. To prevent damage to the cut growth, it is necessary that the cut material be moved entirely in the clear of the standing growth. Tall growths, as well as tangled masses, are difficult to separate through the medium of the conventional divider board, which, as a rule, is effective on relatively short growths only.

Frequently it is necessary to mow tall grain, weeds and the like. In addition to being designed to move the cut growth in the clear of the standing growth, it is necessary that the tall growth be guided so as to fall in the right direction when cut by the sickle. Conventional divider boards, when operating in relatively short growths, are quite effective in moving the cut material away from the standing growth, but the divider boards are entirely ineffectual for clearing tall growths or guiding such growths to fall in the right direction. Tall growths falling into the standing growth leaves a tangled and irregularly formed mass, most of which is damaged upon return of the mowing machine.

Accordingly, it is an object of my invention to provide a swather bar adapted for association with conventional mowing machine sickle bars in which the swather bar is so designed as to effectively clear cut growths away from the standing growths. In addition, the swather bar is so designed as to incline the growth adjacent the standing growth before it is severed by the sickle so as to predetermine the direction of fall to the end that the swather bar will leave a clean path adjacent the standing growth.

A further object is to provide a swather bar in the nature of a rodded structure embodying novel means facilitating connection with a conventional sickle bar.

In the accompanying drawing:

Figure 1 is a side elevational view of a mowing machine showing my invention applied thereto;

Figure 2 is an enlarged top plan view of a portion of the sickle bar illustrating the relation between the swather bar and a conventional sickle bar; and Figure 3 is a perspective view of the swather bar disconnected from the sickle bar.

In the embodiment selected to illustrate my invention, I make use of a mowing machine 10 which includes the usual sickle bar 12 carrying guards 14 operatively related to the sickle knife 16. The outer end of the sickle bar 12 carries a guard shoe 18 which terminates in a rather sharp leading end 20. A divider rod 22 is fixedly related to the guard shoe 18 by a bolt 24. Some machines are equipped with a board instead of the rod 22. The structure so far described is old and well known in the art and need not be set forth in more detail.

My swather bar 26 comprises a rod bent back upon itself to provide slightly curved reaches 28 and 30 converging into a pointed nose 32 about the line of bend. Nose 32 constitutes the leading end of the swather bar. Within the bend 32 I weld one end of a substantially straight bar 34 which substantially bisects the angle between the runs 28 and 30.

Intermediate the ends of the run 28 I weld a conically shaped boot 36 so fashioned as to receive the pointed end 20. The outer end of the run 28 is offset at 38 to provide clearance for the fitting 40. A loop 42 is formed at the rear end of the run 28 for the reception of the bolt 24 which secures the divider rod 22 and the run 28 to the guard shoe 18. Boot 36 provides an effective abutment for supporting endwise forces transmitted to the swather bar, while the loop 42 cooperates with the bolt 24 to restrain the swather bar from pivotal action about the point 20. Loop 42 is flat longitudinally of the reach 28 so as to facilitate a connection with the bolt 24. Elongation of the loop provides accommodation for structural variations to facilitate connection of the swather bar with standard equipment.

Reach 28 bellies downwardly slightly while reach 30 bellies upwardly, in addition to being arranged in diverging relation with the reach 28, see Figure 2. Rod 34 is also arranged in diverging relation with the reach 28 rearwardly of the same. Nose 32 constitutes a divider as it moves into the standing growth so as to facilitate separation of the growth to be cut from the standing wall. The angularity of the reach 30 and the rod 34, as when viewing Figure 2, causes the standing growth effected thereby to be inclined away from the growth side of the swath. Thus relatively high growths will be properly inclined at the moment of severance to aid the swather bar in providing a clear path adjacent the standing growth.

Run 28, together with the nose 32, is positioned quite close to the ground so as to be effective for dividing relatively short growths. Taller growths are deflected away from the standing growth through the medium of a run 28, as well as the bar 34, while exceptionally tall growths are deflected through the medium of both runs and the bar 34. In exceptionally tall growths, the run 30 performs the greater amount of the work, and the reach inclines upwardly to such an elevation as to insure a clear path.

I have found a swather bar of the type described exceptionally efficient in connection with the cutting of unusually tall growths such as cane. Cane many feet in height may be effectively handled. At the present time it is common practice to lay the cane over by hand. My swather bar functions in such a manner as to eliminate all manual labor commonly employed in clearing a path for the machine. The swather bar is equally efficient in cutting tall weeds, grass and the like, in addition to functioning as an efficient divider for relatively short growths. The swather bar is so designed as to be applicable to machines of conventional construction.

Without further elaboration, the foregoing will so fully illustrate my invention that others may, by applying current knowledge, readily adapt the same for use under various conditions of service.

I claim:

1. In combination with a sickle bar including a pointed guard shoe, a swather bar comprising rods arranged one above the other and connected as a unit, said rods converging forwardly to provide a leading nose, a boot fixed to the lowermost rod intermediate its ends for receiving the point of said guard shoe, a portion of said lowermost rod lying adjacent one face of the guard shoe and being fixedly connected thereto, and the other of said rods extending above the guard shoe and angled across the sickle bar for deflecting growth to be cut inwardly of the sickle bar.

2. In combination with a sickle bar including a pointed guard shoe, a swather bar comprising rods arranged one above the other and connected as a unit, said rods converging forwardly to provide a leading nose, a boot fixed to the lowermost rod intermediate its ends for receiving the point of said guard shoe, a portion of said lowermost rod lying adjacent one face of the guard shoe and being fixedly connected thereto, the other of said rods extending above the guard shoe and angled across the sickle bar for deflecting growth to be cut inwardly of the sickle bar, and a third rod positioned between said first rods and having its forward end connected with the first rods at their nose portion, with the third rod substantially bisecting the angle between said first rods.

3. In combination with a sickle bar including a pointed guard shoe, a swather bar comprising rods arranged one above the other and connected as a unit, said rods converging forwardly to provide a leading nose positioned in advance of said guard shoe, a boot fixed to the lowermost rod intermediate its ends for receiving the point of said guard shoe, said lowermost rod having an eye at its rear end and a portion of the rod lying against one face of the guard shoe, a bolted connection between said eye and the guard shoe, and the other of said rods extending above the guard shoe and angled across the sickle bar for deflecting growth to be cut inwardly longitudinally of the sickle bar.

JOHN E. MILLS.